(12) United States Patent
Phillips et al.

(10) Patent No.: US 8,150,621 B1
(45) Date of Patent: Apr. 3, 2012

(54) COMMAND AND CONTROL OF AUTONOMOUS SURFACE VEHICLE

(75) Inventors: Craig A. Phillips, King George, VA (US); David B. Hanger, King George, VA (US)

(73) Assignee: The United States of America as represeneted by the Secretary of the Navy, Washington, DC (US)

( * ) Notice: Subject to any disclaimer, the term of this patent is extended or adjusted under 35 U.S.C. 154(b) by 445 days.

(21) Appl. No.: 12/386,181

(22) Filed: Apr. 7, 2009

(51) Int. Cl.
*G01C 21/00* (2006.01)
(52) U.S. Cl. ........................................ 701/411; 701/448
(58) Field of Classification Search .................. 701/1–2, 701/209–211
See application file for complete search history.

(56) References Cited

U.S. PATENT DOCUMENTS

| | | | |
|---|---|---|---|
| 5,923,270 A | 7/1999 | Sampo et al. | 340/988 |
| 5,938,704 A | 8/1999 | Torii | 701/238 |
| 6,590,831 B1 * | 7/2003 | Bennett et al. | 367/16 |
| 6,751,535 B2 | 6/2004 | Mori | 701/23 |
| 7,158,877 B2 | 1/2007 | Carlsson et al. | 701/206 |
| 7,302,316 B2 | 11/2007 | Beard et al. | 701/11 |
| 7,818,120 B2 * | 10/2010 | Poreda et al. | 701/209 |
| 2004/0054428 A1 * | 3/2004 | Sheha et al. | 700/56 |
| 2006/0089800 A1 | 4/2006 | Svendsen et al. | 701/301 |
| 2008/0133131 A1 * | 6/2008 | Poreda et al. | 701/210 |
| 2008/0268834 A1 * | 10/2008 | Foschini et al. | 455/426.1 |
| 2009/0276105 A1 * | 11/2009 | Lacaze et al. | 701/2 |

OTHER PUBLICATIONS

Scokaert, P.O.M. et al., "Suboptimal Model Predictive Control", *IEEE Trans. on Automatic Control*, Mar. 1999, v. 44, No. 3, pp. 648-654.

Ohlmeyer, E. J. et al., "Generalized Vector Explicit Guidance", *J. Guidance and Control*, Nov.-Dec. 2006, v. 29, No. 2, pp. 261-268.

* cited by examiner

*Primary Examiner* — Hussein A. Elchanti
(74) *Attorney, Agent, or Firm* — Gerhard W. Thielman, Esq.

(57) ABSTRACT

An operating system is provided for controlling an unmanned vehicle. The system includes a stratified plurality of instruction layers, a behavior axiom block and a set of operation parameters. The instruction layers are substantially arranged in descending priority order. Each layer provides an information signal to either an adjacent descending layer or an operation device on board the unmanned vehicle. The behavior axiom block provides an independent protocol signal to a first instruction layer in said stratified plurality. The operation parameters provide an environmental condition that neighbors the unmanned vehicle to a second instruction layer. Preferably, the behavior axiom block includes prioritization adjustment to an instruction layer for overriding the information signal from an adjacently ascendant layer, such as by an interrupt signal.

12 Claims, 10 Drawing Sheets

| Complex Object Mapping to Obstacle Tracks ||||
| Complex Object 1610 | Obstacle Tracks 1620 | Vertex for Avoidance − 1630 + | CPA Buffer 1640 |
| --- | --- | --- | --- |
| 1510 | A, B, C, D | A          C | Large |
| 1520 | F, G, H, J | H          F | Large |
| 1530 | C | E          E | Small (Vertices are the same tracks) |

Goal Seeking Object Avoidance Selection Matrix

| Object | Divert | MM to Obj K | MM to Obj L | MM to Obj M | MM to Obj N | AVG | Ang from Target |
|---|---|---|---|---|---|---|---|
| K | KP | 50 | 50 | 50 | 50 | 50 | 20 |
|   | KS | 50 | 50 | 50 | 50 | 50 | 20 |
| L | LP | 50 | 50 | 50 | 50 | 50 | (10) |
|   | LS | 50 | 50 | 0 | 50 | 37.5 | 6 |
| M | MP | 50 | 0 | 50 | 50 | 37.5 | 7 |
|   | MS | 50 | 50 | 50 | 50 | 50 | 16 |
| N | NP | 50 | 20 | 20 | 50 | 35 | 4 |
|   | NS | 50 | 10 | 0 | 50 | 27.5 | 4 |

Select LP

COMMAND AND CONTROL OF AUTONOMOUS SURFACE VEHICLE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to flexible command and control of an autonomous surface vehicle. In particular, the invention provides a stratified structure of instructions to achieve a mission objective operating within constraint protocols.

Conventional operational methods employ remote control signal devices provided by a human that views sensor information from the unmanned vehicle or from other sources to send steering commands to the vehicle. Some limited autonomy is available for situations without obstacles, traffic, or enemy in which waypoints are issued to the surface vehicle to follow with a simple autopilot on board. The vehicle uses Global Positioning System or a similar system to hold the boat on bearing to the next waypoint. Commercial boat autopilots are available for this purpose for commercial and recreational boating applications to reduce human workload. For these systems, human monitoring remains necessary in the event of traffic or obstacles. For such situations or when the weather obscures visibility or interferes with stability, direct human control of the vehicle steering is required to ensure operational safety and achievement of the vehicle's mission.

An example of where direct human intervention is required is the case of steering relative to an oncoming wave to prevent rollover. Operations such as docking or rendezvous with a command platform all require direct human control of the ship steering. In a situation where the USV supports combat operations, there can be traffic present (including both friendly and hostile) which require human intervention to direct the activities of the vehicle by remote control. In addition, complex missions such as intercepting a potentially hostile incoming boat would require direct human control via a remote link.

Some autonomy is available in missile and aircraft autopilot and missile guidance systems. Aircraft and missile autopilots deal with narrowly defined missions such as stabilization of the aircraft or execution of a commanded turn to a new heading. These automated functions are fairly limited in nature and are designed to work in a rather scripted process.

The greatest amount of autonomy in aircraft systems occurs in the microburst recovery systems for commercial aircraft. Because the limited time required to respond stresses the human reaction time, consensus is developing of the utility to provide limited autonomy to the system to fly the vehicle out of the microburst. This represents a very scripted and optimized flight procedure. Trajectory guidance for an autonomous land attack cruise missile follows a scripted mission without significant flexibility. This limits autonomous operation to a fire-and-forget weapon such as the Tomahawk cruise missile, rather than an unscripted reconnaissance platform such as the Global Hawk aircraft that requires real time flexibility.

Current methods for controlling an unmanned surface vehicle require increased manning requirements for the command platform operating that surface vehicle. Additionally, the current approach to remote control operation of unmanned vessels exhibits decreased functionality during certain periods because the human operators degrade by fatigue or lack of trained personnel. There are also limitations on the mission because of the limited human capabilities. Advanced automatic systems are anticipated be able to pilot the ship in inclement weather conditions better than human operated systems. This arises from the ability to design the system to use sensor input rather than organic feedback to a human operator such as Doppler measurement of water speed and from the faster response time of automated systems.

SUMMARY

Conventional unmanned vehicle control systems yield disadvantages addressed by various exemplary embodiments of the present invention. In particular, various exemplary embodiments provide an architecture for the Command and Control ($C^2$) of an autonomous unmanned ship or surface vehicle with a minimum of human intervention. The Stratified Horizon Control herein provides an architecture for creating an algorithm that interprets the highest level of commander's orders in a linguistic format as might be given to a human operating an equivalent vehicle and autonomously interprets the commanders orders and develops the various levels of controls to ultimately steer and control the speed of the surface vehicle to achieve its commanded mission. This algorithm provides safe, reliable, and effective execution of the commander's intent without increased manning requirements.

Various exemplary embodiments provide an operating system for controlling an unmanned vehicle. The system includes a stratified plurality of instruction layers, a behavior axiom block and a set of operation parameters. The instruction layers are substantially arranged in descending priority order. Each layer provides an information signal to either an adjacent descending layer or an operation device on board the unmanned vehicle.

The behavior axiom block provides an independent protocol signal to a first instruction layer in said stratified plurality. The operation parameters provide an environmental condition that neighbors the unmanned vehicle to a second instruction layer. In various exemplary embodiments, the behavior axiom block includes prioritization adjustment to an instruction layer for overriding the information signal from an adjacently ascendant layer, such as by an interrupt signal.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
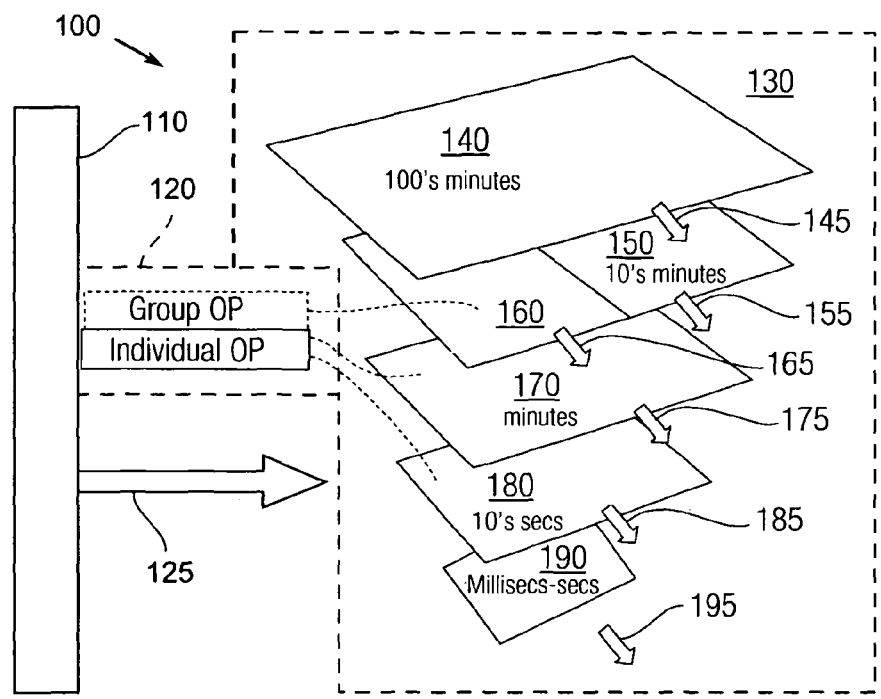
FIG. 1 is a block diagram view of a strategic horizon control system.

FIG. 1 shows an exploded view of a plan for Stratified Horizon Control (SHC), which represents an important aspect in various exemplary embodiments in controlling an unmanned vehicle. Behavior axioms are contained within a behavior axiom block (BAB) 110, operating parameters 120, preemptory prioritization adjustor 125 as adrenaline parameter with interrupt control. The BAB 110 includes safety protocols. The operating procedures 120 include group operating pictures (GOP) and individual operating pictures (IOP).

The plan 100 includes a series of levels for Stratified Horizon Control (SHC) 130. The levels from strategic and long-term for decision to specific and immediate begin with commander's intent interpretation layer 140 that yields global quantitative goals and constraints 145. Next, mission design 150 that yields horizons for lower controls, path constraints and horizon goals 155, and environmental assessment 160 at the same level of detail as the mission design 150 but subject to information received from the operating procedures 120. The assessment 160 yields navigation constraints 165.

Next, route planning layer 170 that yields optimized navigation parameters 175. Next, navigation layer 180 that yields heading rate or heading schedule commands 185 to achieve goal objectives and avoid collisions. Finally, control layer 190 that provides steering and throttle commands 195. Time constraints for integrated decisions and command implementation range from interpretation 140 involving hundreds of minutes or several hours, mission design 150 involving tens of minutes, route planning 170 involving minutes, and navigation 180 involving tens of seconds, down to control commands 190 that involve milliseconds to seconds.

Figure 2:
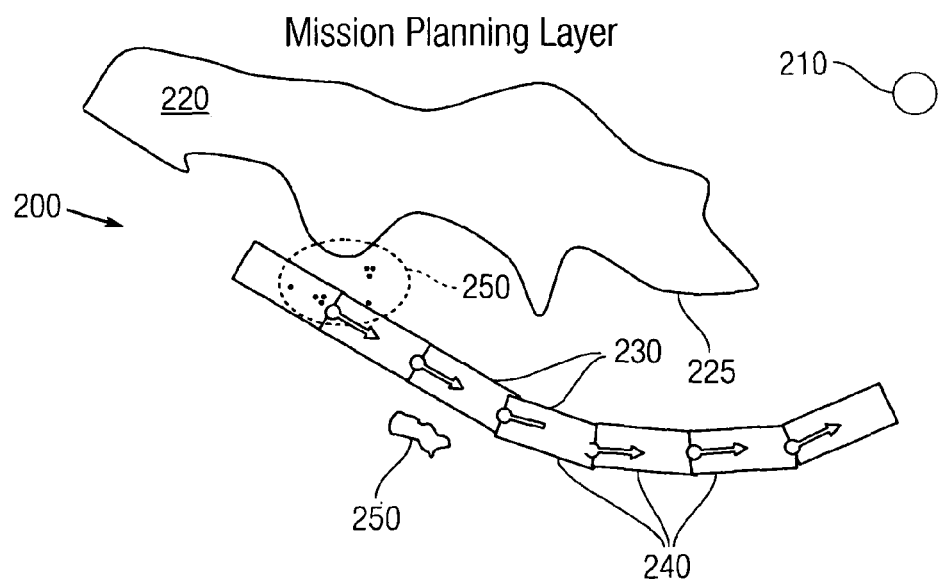
FIG. 2 is a plan view of an operation under a mission design layer.

FIG. 2 shows a plan view of a mission implementation using the SHC 130 as an exemplary mission planning layer 200 that includes constraints from the mission design 150 and environment assessment 160. A mission goal 210 can be identified by the human overseer and is disposed beyond a land mass 220 demarcated by a coast littoral 225. Waypoints 230 together with their directional bearing arrows denote paths marked at horizons 240 that slide along the route planning layer 170. Goals 155 from the mission design layer 150 include the horizons 240. Obstacles denoted by individual points within the dash oval 250 along with a larger, more complex obstacle 260 represent entities to be avoided while navigating towards the goal 210. The navigation constraints 165 include a global survey of objects and hazards from on-board and off-board sensors. The navigation parameters 175 include optimized guidance parameters. The heading commands 185 include acceleration commands to achieve goal and avoid collisions that control the steering and throttle commands 195.

Figure 3:
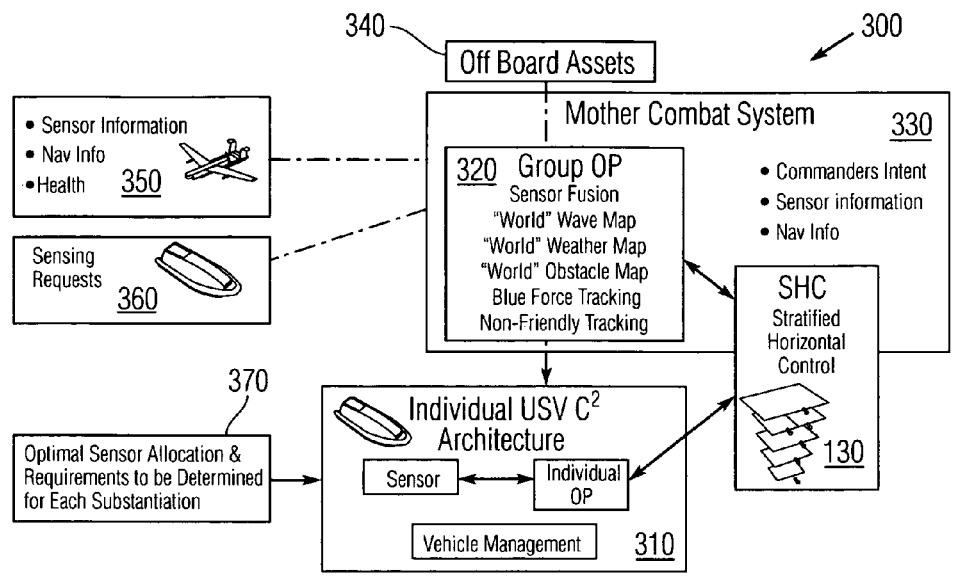
FIG. 3 is a block diagram view of operational parameter reception.

The unmanned surface vehicles must operate relative to a parent command vessel and with other peer surface vehicles. FIG. 3 shows a block diagram 300 for implementing the SHC 130 relative to multi-vehicle operation within the operating procedures 120 for an unmanned surface vehicle (USV). Individual USV $C^2$ architecture 310 includes vehicle management, and sensors that communicate with the IOP, which interface with the SHC 130. GOP 320 communicate with the parent or mother combat system (MCS) 330 that hosts the launch platform, and also associates with the SHC 130. Off Board Assets 340, Sensor Information 350 and Sensing Requests 360 supply information or instructions to the MCS 330. Optimal Sensor Allocation 370 provides supplemental information to the architecture 310.

Figure 4:
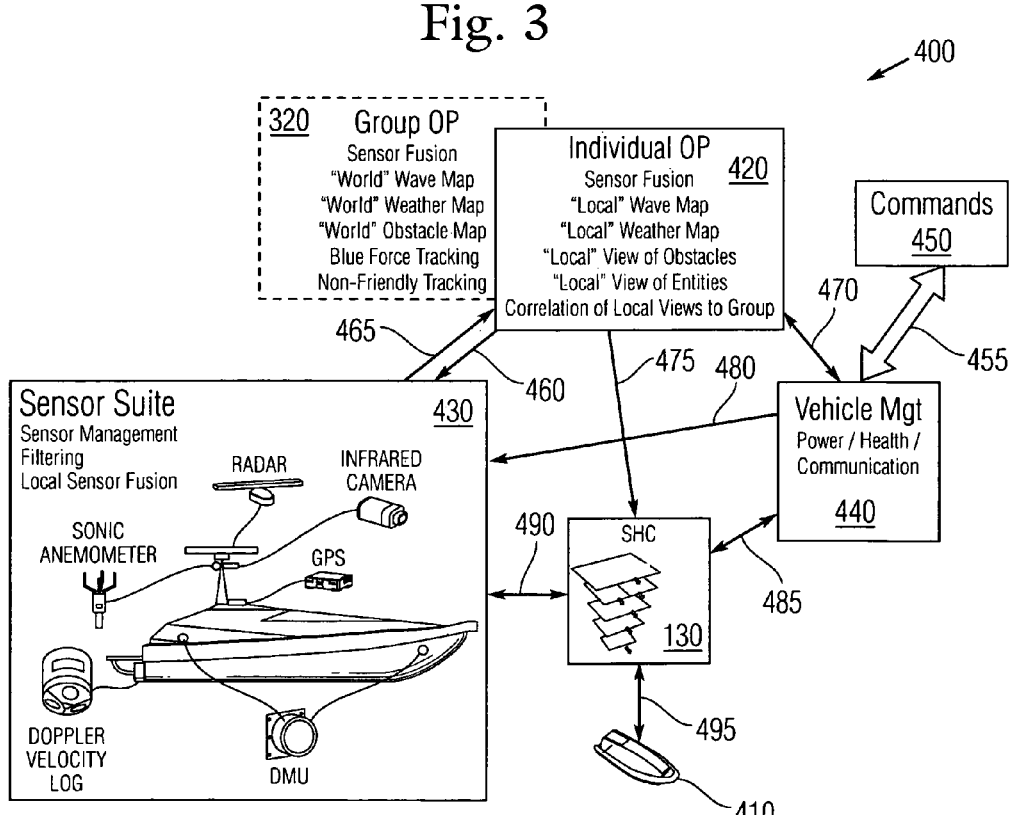
FIG. 4 is a block diagram view of operational parameter integration.

FIG. 4 shows an expanded block diagram 400 for the operation of an individual vehicle using SHC 130. The USV platform 410 employs the $C^2$ architecture 310, including the IOP 420. Together with the GOP 320, the IOP 420 provides information to the SHC 130 for guidance to the platform 410. A sensor suite 430 provides environmental and operational information to the platform 410, such as radar, infrared camera, inertial measurement unit (IMU), global positioning system (GPS), etc. A vehicle management system 440 provides status on power, system health and communication.

Commands 450, provided by the human operator and in conjunction with the SHC 130, operate to provide group controls 455 to the vehicle management 440. Other communications include sensing requests 460 from the IOP 420 to the suite 430, returning with sensor measurements 465, such as presence of local entities with tracks and classification, wave measurements, wind speed, etc. Information 470 exchanges between the operating procedures 120 and the vehicle management 440. Information 475 also exchanges between the operating procedures 120 to the SHC 130. Sensing requests 480 can issue from the vehicle management 440 to the suite 430. The vehicle management 440 provides status updates 485 to the SHC 130, which can pass requests 490 to the suite 430 and throttle/steering commands 495 to the platform 410.

The Stratified Horizon Control (SHC) 130 represents an algorithm that divides the control processes from interpretation of the commander's intention through the actual commands to the steering and speed control into a set of instruction strata. The highest stratum involves the broadest decision making and interpretation and is called the commander's intent interpretation layer 140. This layer deals with the more strategic aspects of the command-and-control mission The interpretation of the commander's intent involves the definition of the mission, constraints, and acceptable levels of risk. The decision making at this level has the longest (time)

horizon for consideration. Having to deal with entire missions, decision-making may extend to the hundreds of minutes. The lowest level of the SHC 130 provides the control outputs to the actuators on the USV platform 410. Typically these are concerned with the desired rudder angle and the desired throttle control though alternate actuator arrangements may be accommodated in this approach. This lowest level of control deals with such inputs as heading or heading angle rate to produce the desired actuator command. The time horizon on this level is very short and deals with decisions affecting hundreds of milliseconds into the future. This architecture allows the implementation of existing off-the-shelf components such as the use of existing autopilots for the lowest level.

Between this uppermost layer and the lowest, the stratification of the control may assume many forms. Descending through these layers of the exemplary architecture illustrated in FIG. 1, the planning becomes more detailed and quantitative and with shorter time horizons. The entire system is designed for adaptability, and thus the horizons for each layer can be determined by the SHC 130 process. The level for setting the horizons can typically be performed in the mission design layer 150.

The functions of each of these layers are discussed in detail in the following sections. These layers have set horizons that are updated at periodically at an interval much less than their above horizons (typically one-tenth of the immediately above horizon). At each update the solution can be completely redesigned with the current states as the initial conditions. Thus, the mission designed at the start of a mission may change considerably by the time of mission completion. Given sufficient environmental information and no surprises, the SHC 130 provides a stable mission definition but the redefinition can be established for adaptability upon receipt of new information.

Another important aspect of the SHC 130 is the Behavior Axioms Block (BAB) 110, which exists outside of the stratified layer and is updated at a very high rate, typically on the order of the control layer 190. That horizon can be relatively brief and confront issues where any of the BAB 110 may be violated. The behavior axioms deal with the survivability of the vessel and the safety of friendly and non-combatant ships and individuals. The BAB 110 conducts its own calculations over its horizon to determine whether any behavior axioms may be violated.

The BAB 110 has the ability to interrupt any layer currently in process by issuances of interrupt message. This interrupt message instills an adrenaline factor in each control factor which can affect its actions. This factor orients the control layer 190 away from mission success to satisfying the BAB 110, which also dictates when the axioms are not in danger of violation and allow resumption of normal operations for the SHC 130. At this point, the commander's intent interpretation layer 140 reinitializes the SHC 130 again from the current vehicle states and environmental conditions.

The commander's intent interpretation level 140 is designed to take linguistic based commands and translates these into mission design parameters. The interpretation of the Commander's Intent involves the definition of the mission, constraints, and acceptable levels of risk. The decision making at this level has the longest (time) horizon for consideration. Having to analyze entire missions, the interpretation level 140 may produce decisions out to the hundreds of minutes. The outputs of this level include the definition of the type of mission such as a patrol of specified region in use of particular sensor suite. Once the type of mission is specified then the mission parameters can be defined.

For example, for a patrol using a specific sensor suite, this level would provide the boundaries of the region, spacing and interlacing of vehicle sweeps, completion time for the patrol, decision node and reporting points, and the acceptable mission risk of the mission. This last parameter deals with the level of urgency associated with the mission and is important for regulating the adrenaline factor used in the lower levels. This factor is used to trade-off risk for probability of mission success in the mission design parameters and for the threshold for when the BAB 110 overrules the planned mission design 150. An example of such a trade-off might be a very high priority mission that follows a path that hits waves at an approach angle that would be avoided in a routine mission. This level depends on the use of embedded knowledge of naval operations to interpret the linguistic commands from the commander. This level employs expert systems to allow access to the level of knowledge that an expert user of the particular boat and experienced sailor might possess of boat and navy operations.

Figure 5:
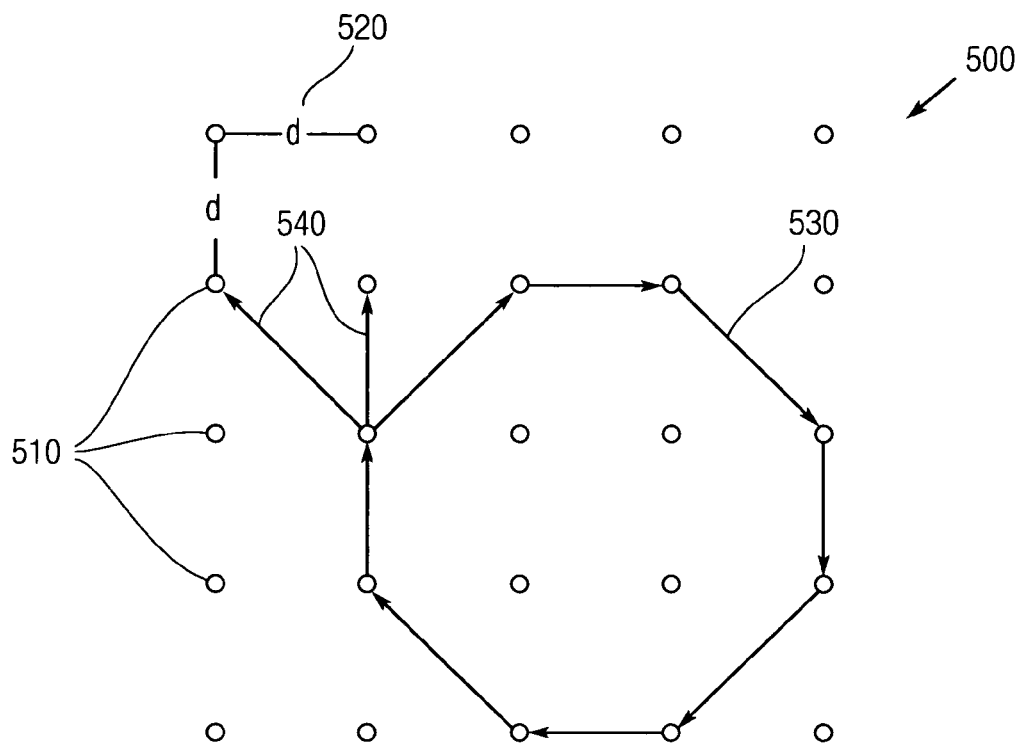
FIG. 5 is a plan view of a navigation grid pattern.

The waypoints 230 between which the platform 410 operates can be described by nodal geometry. FIG. 5 shows a plan view diagram of a navigation grid 500. Nodes 510 are defined by grid position and approach direction and can be arranged in a rectangular pattern separated by a cell width 520 having length d in orthogonal directions. The platform 410 can be directed to follow a directed cycle 530 forming an octagonal ring of inward arcs. Outgoing arcs 540 correspond to approach direction ±45° directed away from the cycle 530.

Figure 6:
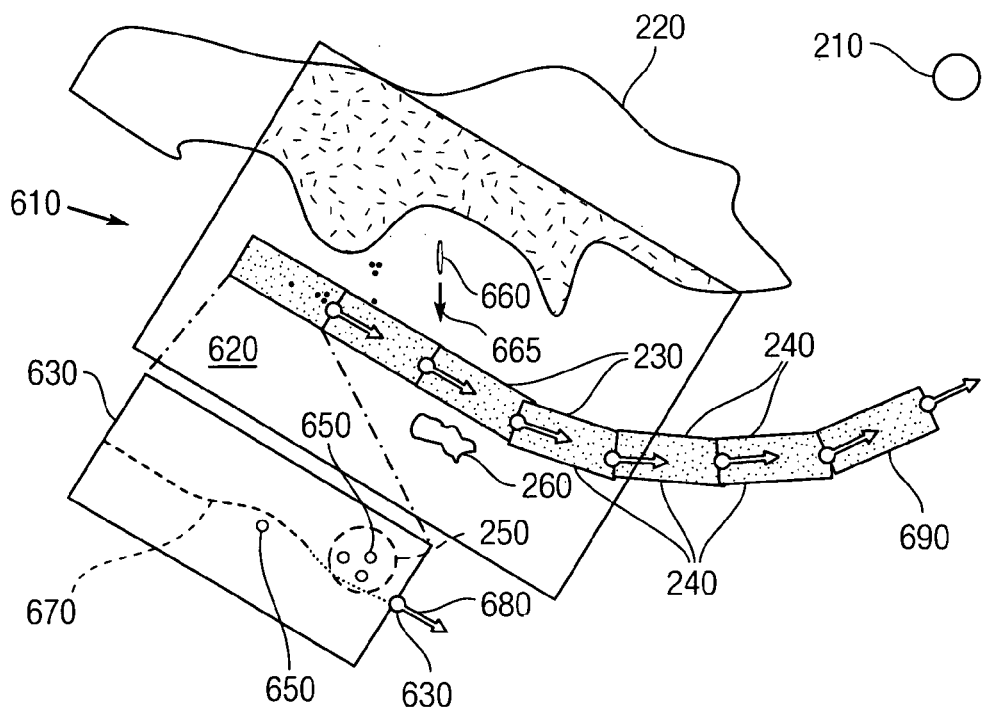
FIG. 6 is a plan view of a horizon network in the FIG. 2 operation.

FIG. 6 shows expanded plan view 600 from FIG. 2 of mission planning layer 150. A sliding window "world view" 610 provides an observation region from which a moving platform 410 can operate from waypoints 230 along concatenated horizons 240 towards the objective 210. Expansion 620 of an exemplary horizon 240 shows a detail horizon 630 with the corresponding waypoint 230 disposed at a horizon boundary 640. To detour obstacles 650 and escape a hostile vessel 660, the platform 410 travels along a navigation line 670 towards a horizon goal at bearing 680.

The mission design layer 150 receives the output of the commander's intent interpretation layer 140 and converts these into quantified mission parameters. The outputs of this layer may typically include: contemporary (and estimates of future values) horizons (time values) for each of the layers and the desired position and heading 230 of the vessel platform 410 at the next horizon 240. Planning in this layer occurs at length and time scales where the dynamics of the vessel are negligible. For the analysis at this level, the platform 410, launch platform 330 may be considered to turn instantaneously and paths consist of straight line segments between nodes 510. In this layer the nodes 510 are used to specify the path 530 or 540.

The selection of nodes 510 includes the avoidance of known large obstacles 650 such as coasts or reefs. Smaller obstacles such as an isolated ship or rock are not considered at this level. The discrimination between which obstacles are included at this level of analysis is made based on maximum dimension of the object. For this determination, groups of closely spaced objects 250 can be combined into a single larger object through clustering algorithms 1700. Consequently, the composite larger object or regions are avoided by mission design 150.

The spacing of nodes that demarcate setpoints on the horizons that are applied to the lower levels and are determined by the type of mission interpreted from the commander's intent interpretation level 140. As an example, if the commanding officer desires to leave port, transit the Atlantic, and then dock at another port, the nodes can be spaced close together in the port regions and relatively far apart in the open ocean areas. Correspondingly, the horizons 240 applied to the deeper layers would be smaller in the ports and larger in the open ocean areas. FIG. 2 for the mission design layer 150 shows the development of horizons for the route planning layer 170 and the selection of node points by the mission design layer 150. The extent of horizon of the route planning layer 170 represents the horizon for the mission design layer 150 which the latter self-selects based on the goal.

The mission design layer 150 develops the horizons for the lower levels and develops the "local world view" for the GOP 320 and IOP 420. The interrelationship of these layers is shown in FIG. 6 for interactions of the SHC 130. The purpose of the route planning layer (RPL) 170 is to compute the nominal parameters used in a navigation algorithm, as in the navigation layer 180. The selection of these parameters is based on optimizing a selected performance function over the horizon of the RPL 170. This timeframe elapses typically on the order of tens of seconds. The specific horizon 630 of the RPL 170 in operation is selected by the mission design layer 150. The RPL 170 represents a simulation based algorithm that uses a simulation of the vehicle to determine the navigation algorithm parameters. The navigation parameters 175 are based on minimizing the time to the desired position and heading at the current RPL horizon. The desired position and heading on the RPL horizon are provided by the mission design layer 150.

Figure 7:
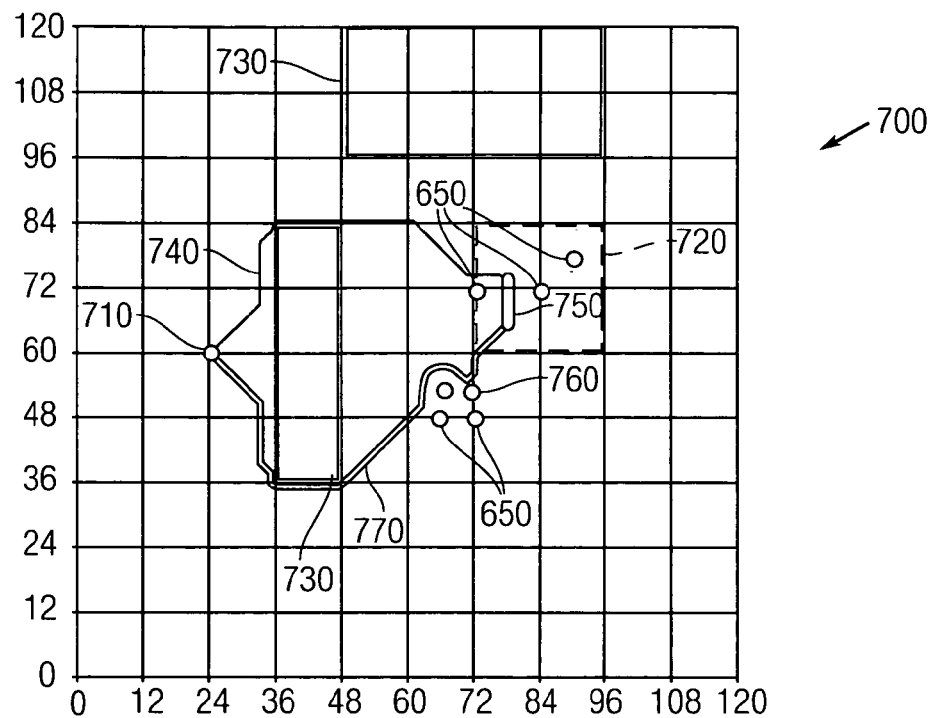
FIG. 7 is a first plan view of an operational mission route.

FIG. 7 shows a plan view of a navigation grid 700 for an example reconnaissance mission as an exemplary embodiment for the mission planning design layer 150. An initial waypoint 710 provides a start position for the platform 410, which is assigned to reconnoiter a patrol area 720 containing obstacles 650, while avoiding keep-out zones 730. The platform 410 begins from the initial waypoint 710 along an ingress path 740 to the patrol area 720. Upon arrival, the platform 410 proceeds to maintain station in a loiter cycle 750 within the patrol area 720 to survey an object 760 under observation. Upon completion of this task, the platform 410 returns to its initial waypoint 710 by an egress path 770 while again avoiding obstacles 650 and the keep-out zones 730.

Figure 8:
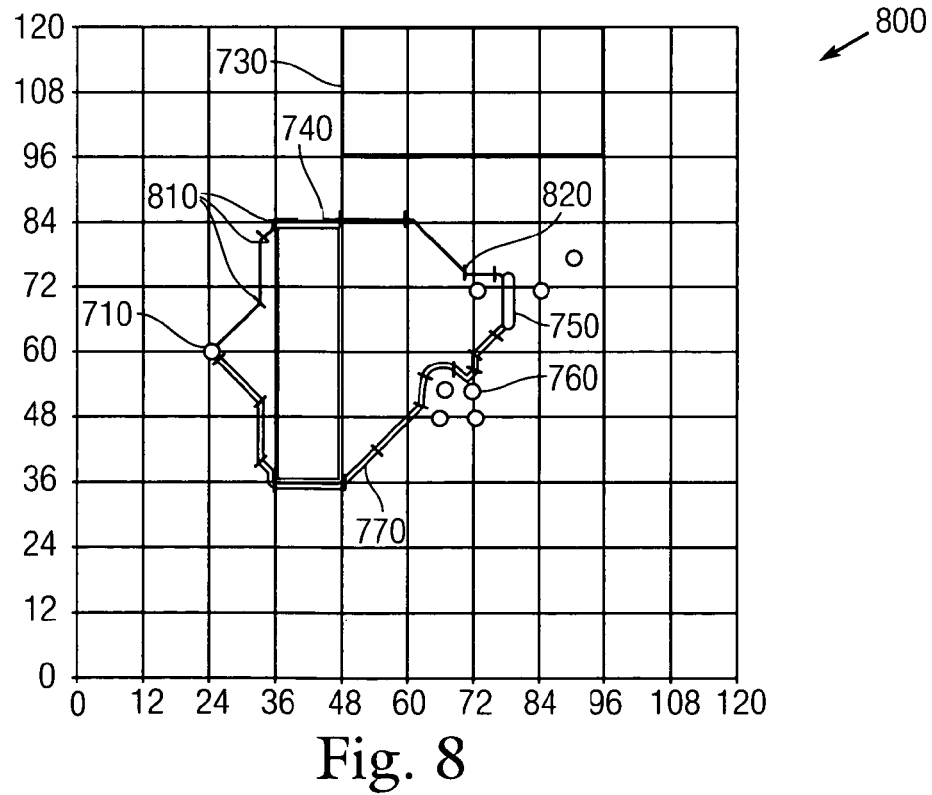
FIG. 8 is a second view of the operational mission route.

FIG. 8 shows an expanded plan view of the navigation grid 800. The ingress and egress paths 740, 770 include demarcation horizons 810 that mark nodes 510 and course change positions. At the entry of the patrol area 720, the path 740, 770 includes goal horizons 820 to indicate time-and-position goals.

Figure 9:
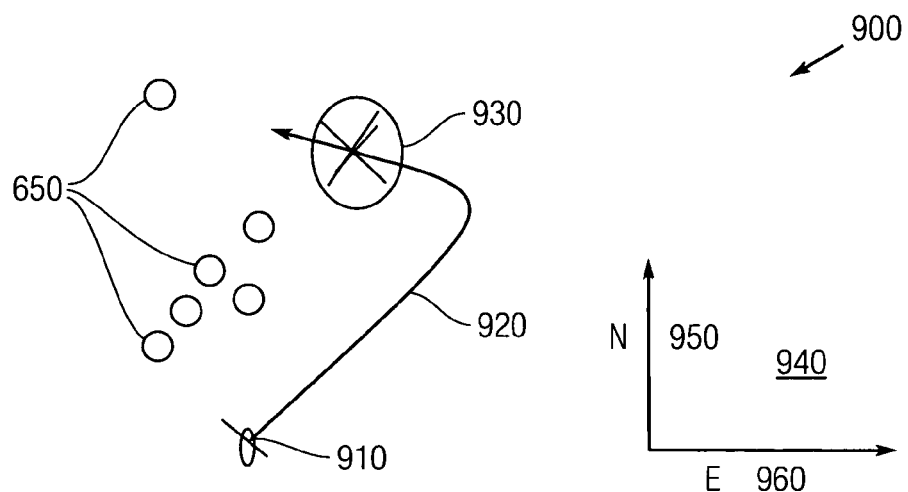
FIG. 9 is a plan view of a first navigation guidance scenario.

FIG. 9 shows a plan view 900 for a first guidance level competency for the navigation layer 180 with guidance to commanded time, position and heading at the next horizon 240. The platform 410 is disposed at an initial horizon boundary 910 corresponding to interval i and travels along a path 920 towards an adjacent horizon 930 at the next interval i+1, denoted by cross-hair oval, while avoiding obstacles 650. An exemplary north-east-down-local (NEDL) frame 940 references global compass directions oriented on first-quadrant Cartesian directions north 950 and east 960. Alternative frames using different directions and/or for other quadrants can be employed.

Figure 10:
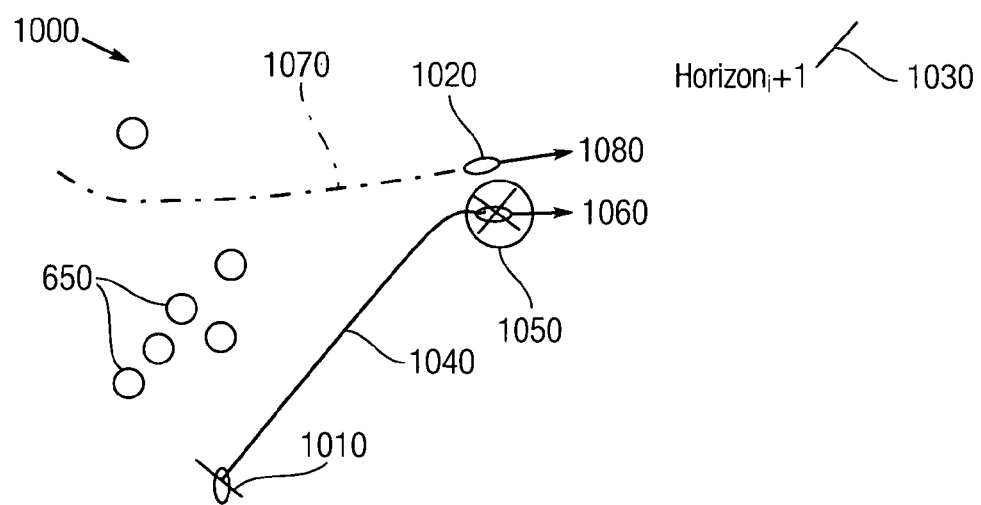
FIG. 10 is a plan view of a second navigation guidance scenario.

FIG. 10 shows a plan view 1000 for a second guidance level competency for the navigation layer 180 guidance to intercept a target with offset rendezvous. The platform 410 is disposed at an initial horizon boundary 1010 corresponding to interval i towards a target vessel 1020 to be intercepted. An adjacent horizon 1030 at the next interval i+1 corresponds to a position not directly along the intercept path 1040. A predicted rendezvous position 1050 and direction 1060 can run parallel to the target vessel 1020 that travels along a target path 1070 and corresponding direction 1080.

Figure 11:
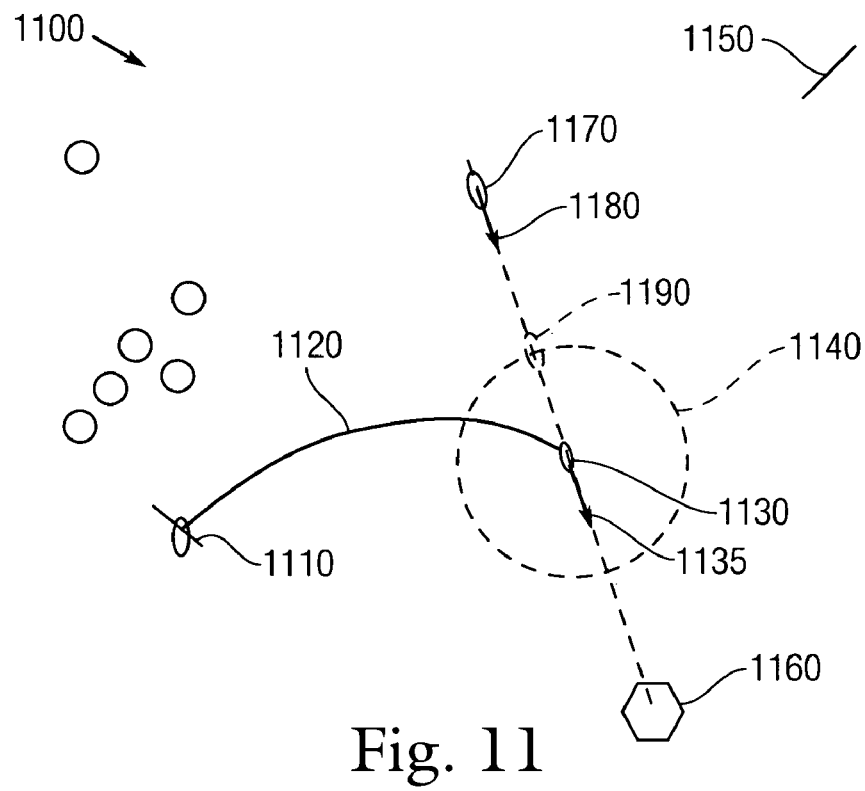
FIG. 11 is a plan view of a third navigation guidance scenario.

FIG. 11 shows plan view 1100 for third guidance level competency for blocking a craft from reaching an intended position. The platform 410 is disposed at an initial horizon boundary 1110 corresponding to interval i along an intercept path 1120 for arrival at an intercept position 1130 in a specified travel direction 1135. At the intercept position 1130, the platform 410 can detect and deter objects within a lethal range radius 1140. An adjacent horizon 1150 at the next interval i+1 corresponds to a position not directly along the intercept path 1120. The intercept position 1130 is disposed between a defended asset 1160 and the craft 1170 to be blocked. By traveling in a direction 1180 towards the defended asset 1160, but reaches the radius 1140 at a range position 1190 for deterrence by the platform 410.

Figure 12:
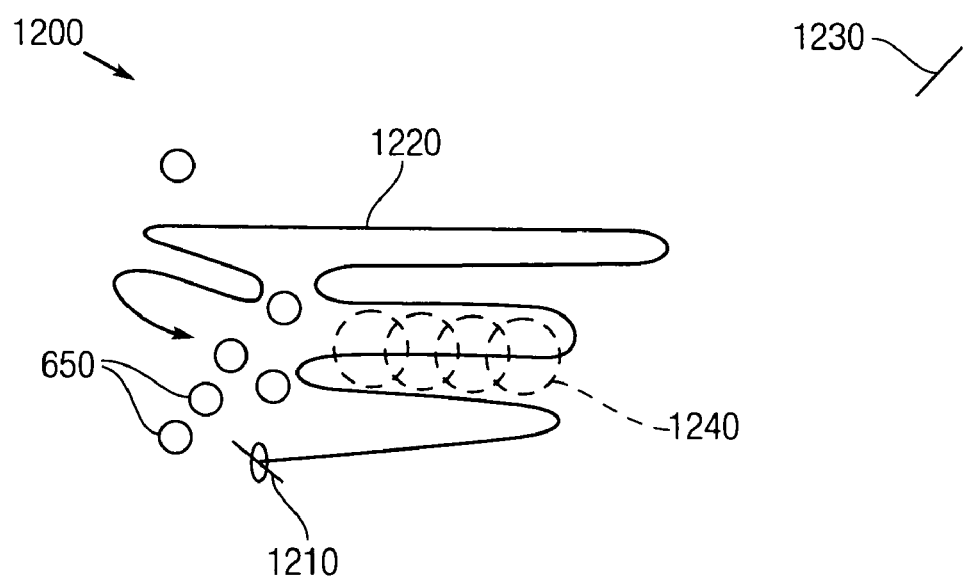
FIG. 12 is a plan view of a fourth navigation guidance scenario.

FIG. 12 shows plan view 1200 for fourth guidance level competency for search and patrol. The platform 410 is disposed at an initial horizon boundary 1210 corresponding to interval i along an intercept path 1220. An adjacent horizon 1230 at the next interval i+1 corresponds to a position not directly along the intercept path 1120, which meanders around obstacles 650 and through regions 1240 for investigation.

Figure 13:
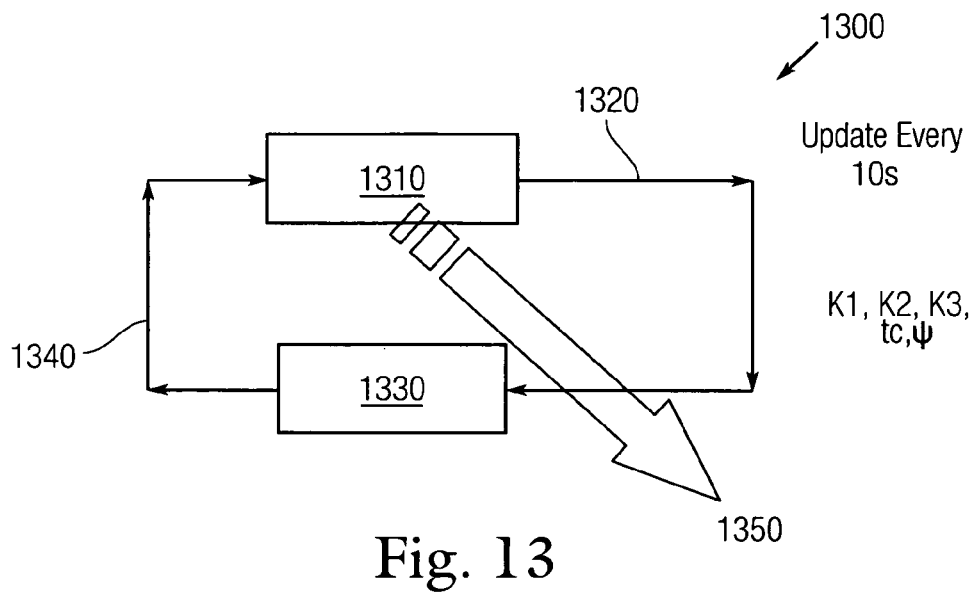
FIG. 13 is a block diagram view of a route planning circuit.

FIG. 13 shows block diagram view of a circuit 1300 for the Route Planning Layer 170 for Guidance. An optimizer 1310 initiates along guide parameters path 1320, such as gain constants $K_1$, $K_2$, $K_3$, $t_c$ and $\psi$ to an on-board simulator 1330 and cycle along an iteration return path 1340. The circuit exhibits directionality 1350 upon optimization to be submitted to the navigation layer 180. The cycle 1300 optimizes parameters to maintain a minimum closest point of approach (CPA) relative to an obstacle in the local horizon, as well as to minimize time. The simulator 1330 integrates over the control horizon using an assumed guidance law with parameters, such as minimum CPA to any object during trajectory, time-to-horizon and final states at horizon.

Figure 14:
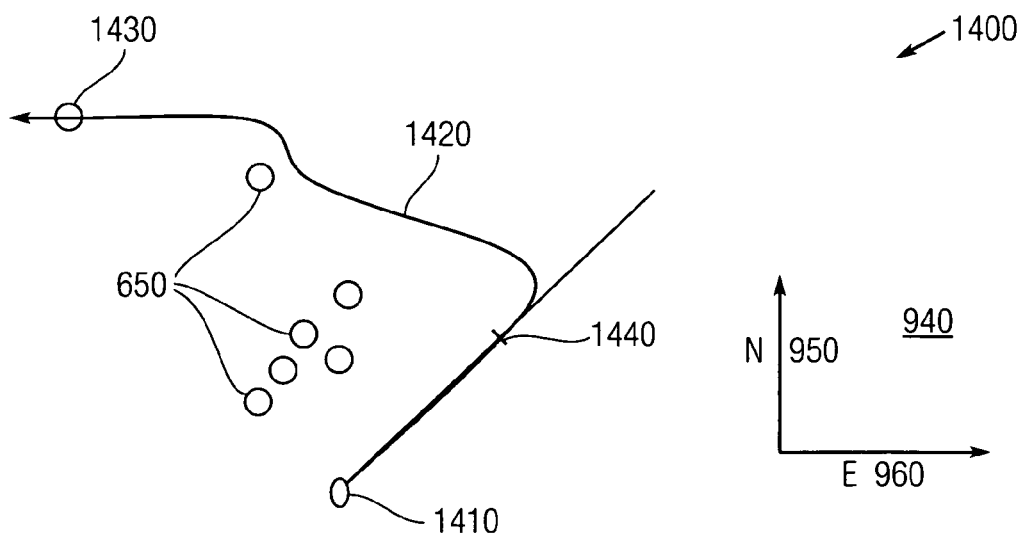
FIG. 14 is a plan view of a composite navigation scenario.

FIG. 14 shows plan view 1400 of a guidance layer for composite navigation along a trajectory with an NEDL frame 940. The platform 410 is disposed at an initial bearing position 1410 and travels along a path 1420 towards an end goal 1430, while avoiding obstacles 650. The path 1420 incorporates composite navigation for avoidance, homing and shaping using optimizer-selected weighting factors. From the initial bearing position 1410 travels in a straight initial bearing until a course correction horizon 1440 that initiates a direction change set at a selected time.

Control law solutions for terminal conditions in vector form include all dimensions such as throttle acceleration to be used for target intercept (i.e., offset rendezvous). The optimal control u can be expressed as:

$$u = \frac{V^2}{R}[K_1(\hat{r} - \hat{v}) + K_2(\hat{v}_f - \hat{v})], \tag{1}$$

where V is missile speed, R is range-to-go to the next waypoint or target point, $K_1$ and $K_2$ are respective guidance gains, $\hat{r}$ is the unit vector for the line-of-sight to the target point, $\hat{v}$ is the unit vector along the current velocity and $\hat{v}_f$ is the unit vector for the desired final velocity orientation. The commanded accelerations can be expressed without throttle control.

Bearing guidance includes an initial bias phase, such as in a P frame, expressed as:

$$\bar{a}_{bearing}^{P} = \begin{Bmatrix} 0 \\ a^{*} \\ 0 \end{Bmatrix} \quad (2)$$

where the vector array includes the middle term such that:

$$a^{*} = [k(\psi^{*} - \psi)], \quad (3)$$

where k is a user selected gain, $\psi^{*}$ and $\psi$ are current bearing angles of the vehicle, and an obstacle avoidance component, also in the P frame, expressed as:

$$\bar{a}_{avoid}^{P} = \begin{Bmatrix} 0 \\ a_{avoid} \\ 0 \end{Bmatrix}, \quad (4)$$

where $$\bar{a}_{avoid}^{P}$$

is a vector of acceleration commands necessary to avoid obstacles.

An optimization or rule-based set algorithm can be used to determine the parameters that minimize the time to the goal point, maintains minimal separation (i.e., the CPA) around known obstacles, and satisfies any heading constraints along the path. Such constraints represent known heading angle constraints due to wave motion in certain regions. One goal includes avoiding the preplan of the route to improve safe maneuver. FIG. 13 for route planning shows the concept for the RPL 170.

The navigation layer 180 is responsible for generating commands for the heading, heading rate, or acceleration to the control layer 190. The navigation layer 180 uses the navigation algorithm parameters 175 selected by the RPL 170 in computing these heading rates or heading schedule. FIG. 14 shows the overview of the procedure for the navigation layer 180, including an initial bearing phase 1410 from which the vehicle 410 turns to a bearing and holds until reaching position 1440 at a designated time $t_c$ from the RPL 170.

Composite navigation provides for obstacle avoidance and path shaping using the parameters from the RPL 170. Depending on the implementation on the USV platform 410, the navigation law can be cast as a commanded acceleration as shown:

$$\bar{a}^{NEDL} = \quad (4)$$

$$T_{P1NEDL}\tilde{K}_1 T_{P1NEDL}^T \bar{a}_{goal}^{NEDL} + T_{P2NEDL}\tilde{K}_2 \bar{a}_{bearing}^P + T_{P3NEDL}\tilde{K}_3 \bar{a}_{avoid}^P,$$

where T and $T^T$ are matrices and their respective transforms.

The commanded accelerations are developed in the reference frame defined by the NEDL frame 940. The three terms provide three, different aspects of the guidance law are blended by a set of three gains contained in the three gain tensors: $\tilde{K}_1$, $\tilde{K}_2$, $\tilde{K}_3$. These gain tensors are formed by: $\tilde{K}_i = K_i$ [I] where [I] is the identity tensor and $K_i$ is a blending weighting scalar for each component of the composite law. The weightings are set by the RPL 170. For generality, the gain may be scheduled in time t such that:

$$K_i = f(t), \quad (5)$$

where time-varying function $f$ is provides rate of gain change.

The three elements of the composite guidance include: $\bar{a}_{goal}$ which is a goal and orientation control algorithm designed to reach goal points on the local horizon, $\bar{a}_{bearing}$ is the acceleration required to follow the bearing, and $\bar{a}_{avoid}$ is the acceleration to avoid objects and environmental conditions, such as the need to approach large waves at a specified angle. The specifics of how these commanded accelerations are computed may be developed in many different substations. The latter two commands are naturally developed in the P frame which has its x axis aligned with the current velocity vector and its z axis aligned with the local gravity vector. $T_{P2NEDL}$ is the transformation from the P frame to the NEDL frame.

Typically, the values for bearing guidance and the avoidance guidance would be terminated at some point in the local horizon. For instance, the bearing guidance computation can be set to zero in response to the specified time of the RPL 170 to follow the bearing has been exceeded. Similarly, the acceleration to avoid objects or environmental conditions would reach a zero value once the time-to-go to the obstacle or environmental conditions has gone negative. This implies that the object is behind the USV platform 410 in terms of the current direction of travel.

The guidance or navigation layer 180 generates commands for the heading, heading rate and acceleration to the control layer 190. Guidance parameters are obtained from the latest route planning update, and measurements from the IMU and GPS are processed using guidance equations to compute acceleration or heading rate. The navigation law can be expressed as a heading rate $\dot{\psi}$ for in-flight composite guidance:

$$\dot{\psi} = V|\bar{a}^{NEDL}| \quad (6)$$

$$= V|T_{P2NEDL}\tilde{K}_1 T_{P2NEDL}^T \bar{a}_{goal}^{NEDL} + T_{P2NEDL}\tilde{K}_2 \bar{a}_{bearing}^P + T_{P2NEDL}\tilde{K}_3 \bar{a}_{avoid}^P|,$$

where V is current speed of the vessel. The first term represents terminal conditions control; the second term determines initial bearing phase and the third term provides obstacle avoidance. The gain tensor is represented by the form:

$$\tilde{K}_n = \begin{bmatrix} K_n & 0 & 0 \\ 0 & K_n & 0 \\ 0 & 0 & 0 \end{bmatrix}, \quad (7)$$

where n is integer 1, 2 or 3. The sign of the commanded heading rate can be computed from the vector relationship on the right hand side of eqn (7). This approach has the benefit of interfacing with existing autopilots for vessel operations.

Figures 15, 16:
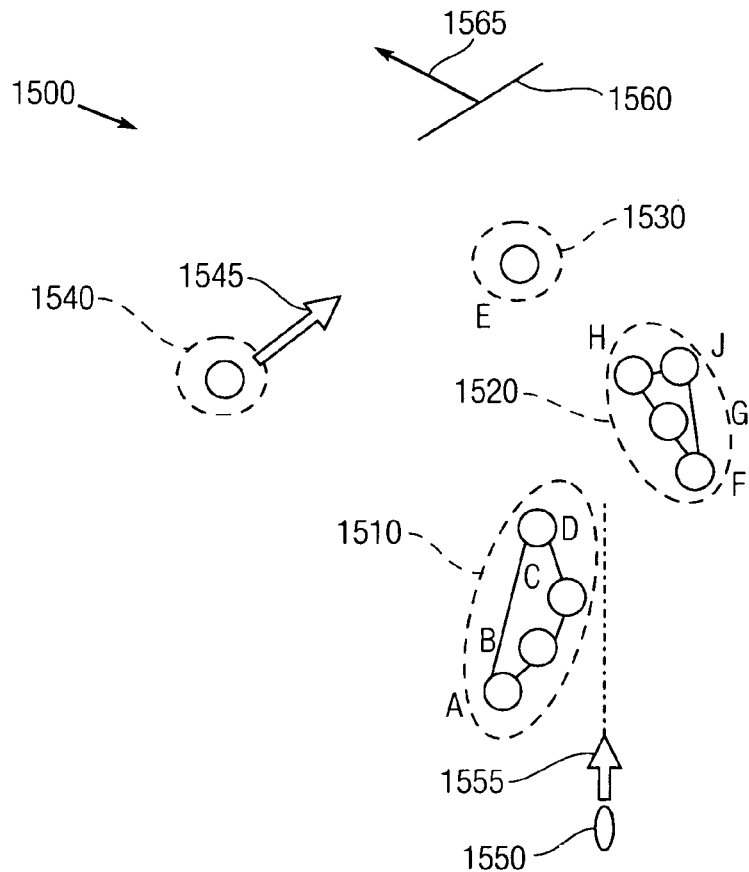
FIG. 15 is a graphical view of optimizer selected time.
FIG. 16 is a tabular view of a complex object map.

FIG. 15 shows a plan view of object cluster process 1500 using fuzzy logic to cluster closely spaced objects. This process can be used to augment obstacle avoidance. A first complex object 1510 includes track items A, B, C, D. A second complex object 1520 includes track items F, G, H, and J. A third complex object 1530 includes track item E. A fourth complex object 1540 travels along a moving vector 1545. Obstacle tracks can be used as vertices for avoidance logic.

FIG. 16 shows tabular view of Complex Object Map 1600 to Obstacle Tracks. The first column 1610 identifies the complex object from the cluster process 1500. The second column 1620 identifies the corresponding object tracks. The third column 1630 lists the corresponding vertex for avoidance. The fourth column 1640 concludes the closest point of approach (CPA) buffer for each object.

Figures 17, 18:
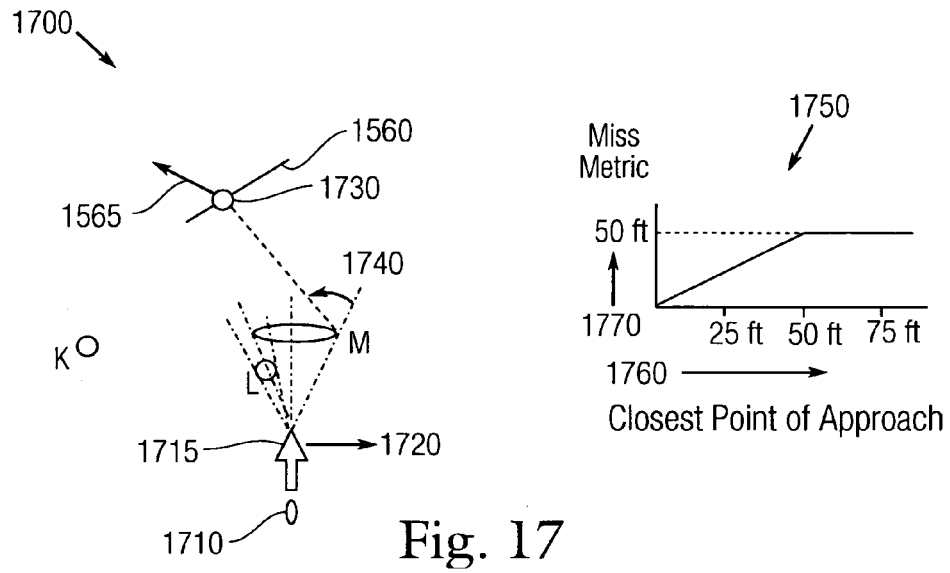
FIG. 17 is a plan view of an object avoidance mission.
FIG. 18 is a tabular view of a selection matrix for obstacle avoidance.

FIG. 17 shows a plan view of goal seeking object avoidance 1700. During operations, the divert angle to each object (port L or starboard R) can be computed. The resulting miss metric (MM) or of all other objects can be computed for each maneuver. A platform 1710 travels in an initial direction 1715 with a divergence direction 1720 for avoidance acceleration. A stage goal 1730 is disposed at the horizon edge 1560 (representing terminal conditions) traveling in the direction 1565.

Obstacles K, L and M lie disposed between the traveling platform 1710 and the goal 1730. No avoidance is required for the K obstacle. However, the L obstacle can be circumvented by dash-line divert directions to port, and the M obstacle can be circumvented by dash-line divert direction to starboard. Upon passing the M obstacle through the divert maneuver, a goal angle 1740 directs the platform 1710 to the goal 1730. A plot 1750 illustrates the relation between the abscissa 1760 as the closest point of approach and the ordinate 1770 as the miss metric. Diversion to expand approach distance around an obstacle is maintained to equal the miss metric reaches fifty-feet in this example.

FIG. 18 shows a tabular view of a selection matrix 1800 for goal-seeking object avoidance. The columns include lists of obstacle objects K, L and M, the divert direction (port and starboard), the miss metric to the respective obstacles, the average and the angle to target. The diversion from L to port is selected with the corresponding angle from target circled.

Figure 19:
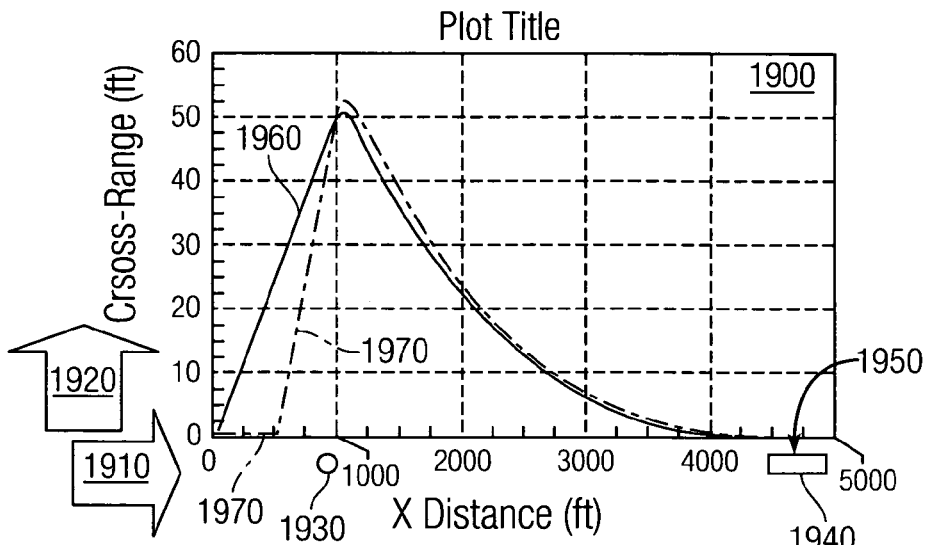
FIG. 19 is a graphical view of down and cross-range distances for collision avoidance during a docking mission.

FIG. 19 shows graphical view of a plot 1900 for optimizer navigation substantiation. An exemplary docking mission involves a jet-ski craft (starting at the origin) to a pier with a single waypoint and an obstacle blocking a straight path. The abscissa 1910 represents downrange distance from the origin and the ordinate 1920 represents cross-range distance. An obstacle 1930 is disposed between the origin and the pier 1940 that represents the goal. A known-obstacle path 1960 enables avoidance of the obstacle 1930 assuming initial availability of this information to ensure an imposed 50-foot clearance. A pop-up path 1970 provides an alternate route limited to ⅓g (one-third gravitational acceleration) maneuverability limit assuming a delay in obstacle detection.

Figure 20:
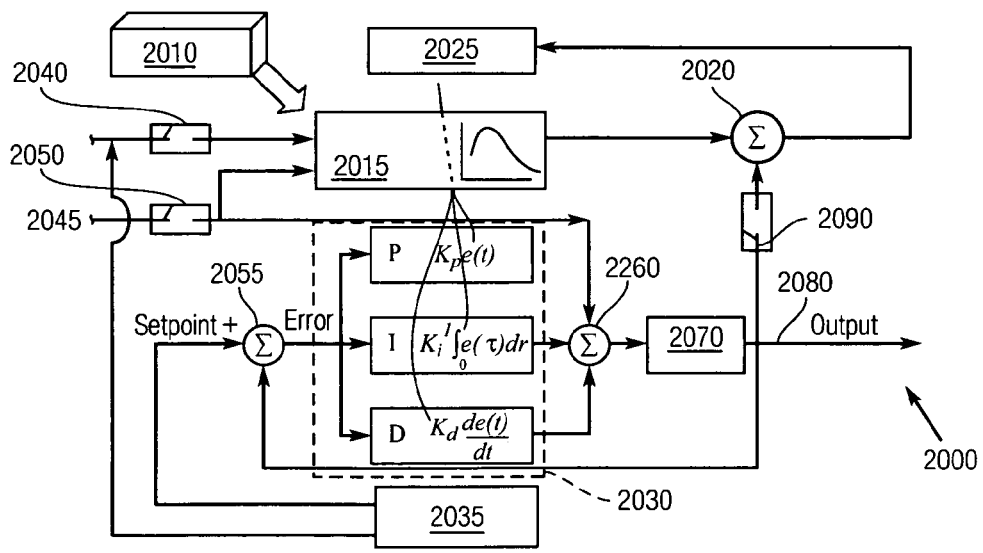
FIG. 20 is a block diagram view of a PID controller.

FIG. 20 shows a block diagram 2000 of an adaptive proportional-integral-differential (PID) controller for boat lateral command. Desired dynamics 2010 are provided to a predicted response algorithm 2015 to generate a response fed to a first sum operator 2020 for receipt to a rule-set 2025 for adjusting gains for receipt into a controller 2030. A signaler 2035 provides inputs, such as yaw, yaw rate, heading angle, speed and environmental conditions at the previous instrumentation sample to the algorithm 2015 through a first gate 2040. A periodic impulse rudder input 2045 is provided to the algorithm 2015 through a second gate 2050.

The controller 2030 provides an exemplary implementation of the control layer 190 that includes proportional (P), integral (I) and differential (D) functions, receiving through a second sum operator 2055 error correction from feedback (negative) from the output and commanded heading rate (positive) from the signaler 2035 as the setpoint. Outputs from the functions are summed in a third sum operator 2060 as boat true-dynamics output 2080, such as rudder command in degrees. The summation output represents achieved yaw, yaw rate and heading rate for the boat. This output 2080 is returned as feedback through a third gate 2090 to the first sum operator 2020, as well as to the second sum operator 2055.

Figure 21:
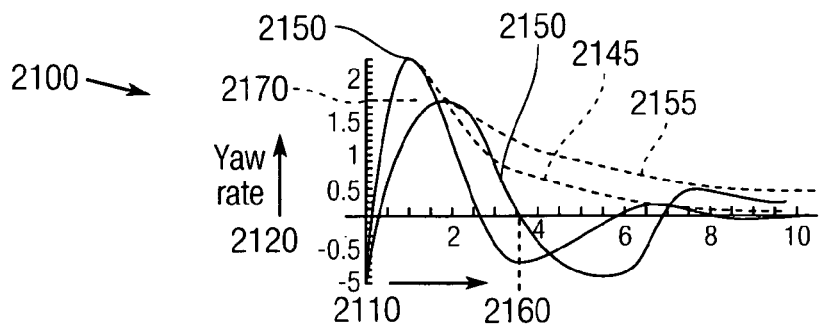
FIG. 21 is a graphical view of a yaw rate response.

FIG. 21 shows a graphical view of a response plot 2100 for an adaptive PID controller used in boat lateral command. The abscissa 2110 represents time and the ordinate 2120 represents yaw rate. A first damped sinusoidal curve 2140 represents an initial unadjusted response to a kick with high peak and rapid attenuation as shown by lower envelope decay 2145. A second damped sinusoidal curve 2150 represents an adjusted simulation response with upper envelope decay 2155. The second curve 2150 corresponds to a time to first zero-axis crossing 2160 occurring at about 3.6 seconds and a desired peak response 2170. PID gains $K_p$, $K_i$ and $K_d$ (for proportional, integral and differential, respectively) can be adjusted to achieve these conditions.

Various exemplary embodiments provide the USV platform 410 with the ability to autonomously conduct a broad spectrum of missions equivalent to those which a commander might expect of a human operated surface vehicle. The ability to do this autonomously provides the commander with an expanded combat and operations capabilities without the attendant growth in manpower on the ship. The first generation of USV requires an additional complement of five-to-ten people to conduct operations of the platform 410.

Various exemplary embodiments decrease manning requirements and augment combat and operational capability for the command platform (mother ship) 330 operating a USV platform 410, increased continuous functionality because human intervention becomes optional such that and the systems do not degrade by fatigue from human operation, and increased functionality because the automatic system are able to perform missions that humans cannot accomplish.

Various exemplary embodiments provide the use of layers of automation with each layer dealing with the total problem at different levels of abstraction and time horizon. This process enables the mimicry of the human capability for strategic decision making as compared to the tactical decision making. By parsing out lower-level considerations for the higher strategic levels, the amount of computational time is greatly reduced. This approach thereby reduces complexity of the software. The minimum number of logic paths operating at each layer reduces testing time necessary to identify and correct the logic errors for ensuring safe and efficient operation, as compared to branch-and-tree approaches.

Conventional alternatives of exemplary embodiments include high personal attention for continued use of manned remote control operations of the USV platform 410. This has the attendant problems of increased manning requirements on the command platform 330, lower performance caused by operator fatigue, and lower total performance from communication lags due to fleet bandwidth limitations and human limitations. An alternate approach to automation is to use the branch-tree method as seen in applications such as chess programs. This approach is very computational intensive despite the game-playing characteristics, thus necessitating only a very limited need for situational awareness as compared to real world operations.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An unmanned vehicle operating a control process, said process comprising:
 a stratified plurality of instruction layers substantially arranged in descending priority order, said plurality further including:

a commander intent interpretation layer issuing a strategic constraint, a mission design layer issuing a boundary horizon;

an environmental assessment layer providing instrumentation information, a route planning layer that issues a navigation parameter, a navigation layer that issues a heading direction for the unmanned vehicle, and a control layer that issues at least one of a steering command and a throttle command for the unmanned vehicle;

a behavior axiom block for providing an independent protocol signal to an instruction layer in said stratified plurality; and a set of operation parameters for providing an environmental condition neighboring the unmanned vehicle to said environment assessment layer as said instrumentation information.

2. The vehicle according to claim 1, wherein:

said interpretation layer provides said strategic constraint to said mission design layer and said environmental assessment layer, said mission design layer provides said boundary horizon to said route planning layer, said environmental assessment layer provides said instrumentation information to said route planning layer, said route planning layer provides said navigation parameter to said navigation layer, said navigation layer provides said heading direction to said control layer, and said control layer provides said steering command to a steer controller and said throttle command to an engine controller.

3. The vehicle according to claim 1, wherein said behavior axiom block includes prioritization adjustment to said instruction layer for overriding said information signal from an adjacently ascendant instruction layer.

4. The vehicle according to claim 1, wherein said boundary horizon from said mission design layer includes:

a path along which the unmanned vehicle travels;

a waypoint at a forward edge of said boundary horizon; and an instant directional heading corresponding to said waypoint.

5. The vehicle according to claim 1, wherein said order corresponds to substantially decreasing time interval for updating said information signal from said each layer and said adjacent descending layer.

6. The vehicle according to claim 1, wherein said behavior axiom block includes prioritization adjustment to a third instruction layer for overriding said information signal from a fourth instruction layer adjacently ascendant to said third instruction layer.

7. The vehicle according to claim 1, wherein said behavior axiom block includes a safety protocol directive.

8. The vehicle according to claim 1, wherein said protocol signal includes an interrupt signal.

9. The vehicle according to claim 1, wherein at least one of said instruction layers includes an algorithm for collision avoidance.

10. The system according to claim 9, wherein said algorithm includes an instruction to adjust a heading of the unmanned vehicle to circumvent said obstruction location.

11. The system according to claim 9, wherein said algorithm maintains an established distance from said obstacle.

12. The system according to claim 1, wherein said environmental condition further comprises at least one of local time, inertial reference, global positioning system signal, speed, acceleration, relative bearing, goal position, and obstruction location.

* * * * *